United States Patent
Eldar et al.

(10) Patent No.: US 8,327,448 B2
(45) Date of Patent: Dec. 4, 2012

(54) PROTECTED CLOCK MANAGEMENT BASED UPON A NON-TRUSTED PERSISTENT TIME SOURCE

(75) Inventors: Avigdor Eldar, Jerusalem (IL); Omer Levy, Rehovot (IL)

(73) Assignee: Intel Corporation, Santa Clara, CA (US)

( * ) Notice: Subject to any disclaimer, the term of this patent is extended or adjusted under 35 U.S.C. 154(b) by 1208 days.

(21) Appl. No.: 11/158,968

(22) Filed: Jun. 22, 2005

(65) Prior Publication Data
US 2006/0294593 A1 Dec. 28, 2006

(51) Int. Cl.
G06F 21/00 (2006.01)
(52) U.S. Cl. .................. 726/26; 726/6; 726/34
(58) Field of Classification Search .............. None
See application file for complete search history.

(56) References Cited

U.S. PATENT DOCUMENTS

| | | | |
|---|---|---|---|
| 5,489,095 A | 2/1996 | Goudard et al. | |
| 5,500,897 A | 3/1996 | Hartman, Jr. | |
| 5,892,900 A * | 4/1999 | Ginter et al. | 726/26 |
| 6,393,126 B1 | 5/2002 | van der Kaay et al. | |
| 6,728,880 B1 | 4/2004 | Sites | |
| 7,155,629 B2 | 12/2006 | Lange-Pearson et al. | |
| 7,409,557 B2 * | 8/2008 | Teppler | 713/178 |
| 2002/0104004 A1 * | 8/2002 | Couillard | 713/178 |
| 2003/0093705 A1 | 5/2003 | Kriz et al. | |
| 2003/0115503 A1 * | 6/2003 | Lehman et al. | 714/25 |
| 2004/0128549 A1 * | 7/2004 | Poisner | 713/201 |
| 2004/0205368 A1 | 10/2004 | Lange-Pearson et al. | |
| 2005/0160272 A1 * | 7/2005 | Teppler | 713/178 |
| 2006/0075264 A1 * | 4/2006 | Willman et al. | 713/194 |
| 2008/0307495 A1 * | 12/2008 | Holtzman et al. | 726/2 |
| 2009/0083372 A1 * | 3/2009 | Teppler | 709/203 |

FOREIGN PATENT DOCUMENTS

| | | |
|---|---|---|
| EP | 0875863 A2 | 11/1998 |
| EP | 1229424 A2 | 8/2002 |
| KR | 200489472 | 10/2004 |
| WO | WO-03093705 A1 | 5/2003 |

(Continued)

OTHER PUBLICATIONS

Looi, M. H., et al., "A Note on Supplying a Trusted Clock Via a Secure Device", *Computers & Security*, Elsevier Science Publishers. Amsterdam, NL, 13(7), (1994),611-613.

(Continued)

*Primary Examiner* — Eleni Shiferaw
*Assistant Examiner* — Jeffery Williams
(74) *Attorney, Agent, or Firm* — Schubert Law Group PLLC

(57) ABSTRACT

Methods and arrangements to persist a trusted time for a protected clock based upon a non-trusted but persistent time source are disclosed. Embodiments may comprise an embedded device, which may be hardware, software, firmware, and/or other logic, to maintain a trusted time in a protected clock. The embedded device may initialize the protected clock by obtaining a trusted time from a trusted time source such as a network server. The embedded device then maintains the trusted time in the event of a power loss to the protected clock by monitoring a time differential between the protected clock and a non-trusted system clock. Many embodiments also employ the protected clock without a battery backup to advantageously save manufacturing costs and space, while maintaining the trusted time in the event of a power loss by relying on a battery backup for the non-trusted system clock. Other embodiments are disclosed and claimed.

57 Claims, 5 Drawing Sheets

FOREIGN PATENT DOCUMENTS

| | | |
|---|---|---|
| WO | WO-2004205368 A1 | 1/2004 |
| WO | WO-2004061631 A1 | 4/2004 |
| WO | WO-2004061631 A1 | 7/2004 |
| WO | WO-2007002451 A1 | 1/2007 |

OTHER PUBLICATIONS

"International Search Report and Written Opinion received for PCT Application No. PCT/US2006/024560 mailed on Oct. 18, 2006", 11 pages.

"International preliminary report on Patentability received for PCT Application No. PCT/US2006/024560, mailed on Jan. 10, 2008", 7 pages.

"Office Action received for German Application No. 112006001666.0-53, mailed on Sep. 3, 2008", 7 pages.

"Office Action received for Korean Application No. 2007-7029743, mailed on Apr. 9, 2009", 9 pages.

200680020631.3, "Office Action received for Chinese Patent Application No. 200680020631.3, mailed on Apr. 24, 2009", 6 pages of Office Action and 5 pages of English Translation.

\* cited by examiner

US 8,327,448 B2

PROTECTED CLOCK MANAGEMENT BASED UPON A NON-TRUSTED PERSISTENT TIME SOURCE

FIELD

The present invention is in the field of platform management. More particularly, the present invention relates to methods and arrangements to persist a trusted time for a protected clock based upon a non-trusted but persistent time source.

BACKGROUND

The utility of computers and development of relatively low cost computer solutions has resulted in a reliance on the computers and network resources for many facets of personal and business related activities. For instance, computers are heavily relied on by businesses for, e.g., telecommuting, obtaining news and stock market information, trading, banking, shopping, shipping, communicating in the form of Voice Internet protocol (VoiceIP) [see International Telecommunications Union (ITU) Recommendation H.323 titled "Packet-based Multimedia Communication Systems," published in November 2000 and available from "www.itu.int" ("H.323 Specification")] and email, as well as other services. For many individuals even, personal computers represent an essential tool for their livelihood.

A key issue for the utilization of personal computers for transacting business across a network is the maintenance of accurate time. Maintaining an accurate time directly affects not only the security of transactions via, e.g., security certificates, but also the ability to maintain proper operation of the computer system. For instance, Kerberos is a network authentication protocol that uses strong cryptography so that a client can prove its identity to a server and vice versa via an insecure network connection. In particular, the Kerberos Authentication System uses a series of encrypted messages to prove to a verifier that a client is running on behalf of a particular user. The verifier checks the timestamp on the messages to make sure that the authenticator is fresh. If the timestamp is within a specified time window, which is typically five minutes, centered around the current time on the verifier, the verifier may accept the message as authentic. However, if the system time on, e.g., the verifier or a message is inaccurate and, as a result, the timestamp appears to be more than, e.g., five minutes old, the verifier will not consider the message to be fresh and will reject message.

As a further illustration, a system administrator may review system logs and error logs to track down the source of a problem on a computer system. However, if the time indications for the system events are not precise, let alone accurate, the system administrator will have a much more difficult job trying to figure out the source of the problem. This situation is exacerbated when the system log is from, e.g., a network server, the error log is from a workstation, and one or both of the logs have inaccurate timestamps. Thus, the system administrator may be unable to correlate events at the workstation with events at the network server.

A problem that has evolved along with the proliferation of computers and networks is that non-trusted users such as hackers who interact with a computer system directly or remotely via software, viruses, and worms. One common tactic is to modify the time of one or more of the systems in a computer network. Modifying the time on a workstation some number of years into the past may allow a hacker to gain access to confidential data on the network via an expired security certificate. Such attacks are categorized as penetration attacks.

On the other hand, modifying the system time some number of years into the future can cause the system to deny valid certificates from other, trusted users. Such attacks are often referred to as denial of service attacks and they can literally freeze communications for the particular computer system and possibly throughout the entire network. The Kerberos authentication protocol, for instance, requires that the clocks are synchronized within minutes of one another so an attacker can successfully execute a "Denial Of Service attack" if the attacker can modify one or both of the clocks by mere minutes.

Current solutions involve security measures to prevent non-trusted users from gaining access remotely via direct communications or a virus or worm, but as the security measures available improve, the attacks implement more sophisticated tactics to circumvent the security measures. Solutions may also establish a single, trusted time source. A single, trusted time source is established for a network because the system time on individual workstations can be modified by other non-trusted sources including the designated user of the workstation who may purposely or inadvertently facilitate access to the system time. Establishing the single, trusted time source to access for time indications for validating certificates and creating logs, however, requires that each computer system to access the time source each time, or at least often, to attenuate the problems associated with utilizing the non-trusted time source. Having every computer on the network validate security certificates and create logs by accessing the trusted time source for the time can significantly impact bandwidth as well as latencies involved with processing transactions.

BRIEF DESCRIPTION OF THE DRAWINGS

Advantages of embodiments of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements to persist a trusted time for a protected clock based upon a non-trusted but persistent time source are contemplated. Embodiments may comprise an embedded device, which may be hardware, software, firmware, and/or other logic, to maintain a trusted time in a protected clock. The embedded device may initialize the protected clock by obtaining a trusted time from a trusted time source such as a network server. The embedded device then maintains the trusted time in the event of a power loss to the protected clock by monitoring a time differential between the protected clock and a non-trusted, but persistent system clock. For instance, in some embodiments, the embedded device may receive an interrupt when the non-trusted system clock is modified and, in response, updates the time differential between the trusted time and the system time. The embedded device then stores time differential in a non-volatile memory in case of a power loss.

Many embodiments advantageously employ the protected clock without a battery backup to save manufacturing costs and space, but may still maintain the trusted time in the event of a power loss by relying on a battery backup for the non-trusted system clock. In particular, the non-trusted system clock may be substantially inaccessible in the event of such a power loss so the embedded device may rely on the accuracy of the persistent time indicated by the system clock when power is restored.

While portions of the following detailed discussion describes embodiments of the invention with reference to an embedded manageability device and managed firmware, persons of ordinary skill in the art will recognize that embodiments may implemented via, e.g., a secure partition or other secure environment that restricts access to a protected clock to trusted code and/or devices.

Figure 1:
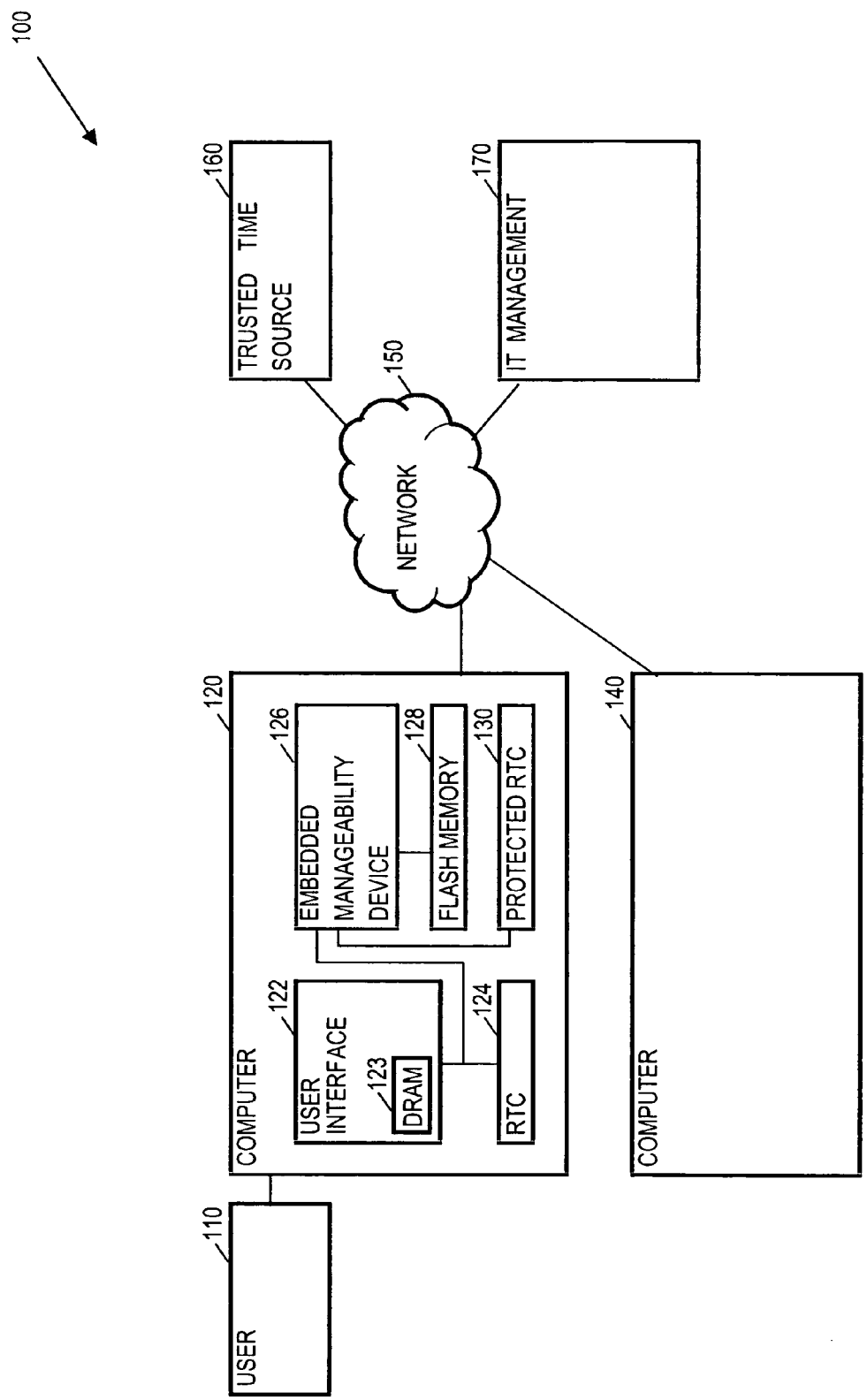
FIG. 1 depicts an embodiment of a system including a computer with an embedded manageability device to maintain a trusted time on a protected clock via an no-trusted, real-time clock (RTC)

Turning now to the drawings, FIG. 1 depicts an embodiment of a system 100 including a computer 120 with an embedded manageability device 126 to maintain a trusted time on a protected clock 130 via a non-trusted, real-time clock (RTC) 124. System 100 comprises computer 120, computer 140, network 150, trusted time source 160, and information technology (IT) console 170.

Computer 120 may be a personal computer such as a desktop or laptop computer, which offers a user 110 direct access via, e.g., a display, keyboard, and mouse. Computer 120 may also couple with a network 150 to provide the user access to email, network resources, and, in some embodiments, remote access by other computers connected to network 150 such as computer 140. User 110 may purposely or unintentionally set the system time for computer 120 by directly accessing the clock setting or by executing code. The time setting may be offset from the time source utilized by other computers connected with network 150, offset due to differences in time zones of the computers, or offset to a past or future date. In any case, the time indication of RTC 124 may be inaccurate for the purpose of correlating system logs, validating security certificates, and/or the like.

Computer 120 may comprise a user interface 122, RTC 124, embedded manageability device 126, a flash memory 128, and protected RTC 130. User interface 122 may be a non-trusted interface coupled with RTC 124 to facilitate a modification of the system time by a non-trusted time source. For example, user interface 122 may be a system preference accessible via window that allows user 110 to set the time and date of RTC 124. In particular, user interface 122 may comprise code stored in a memory such as dynamic random access memory (DRAM) 123, or other memory. When executed, the code may interact with user 110, computer 140, or another non-trusted time source to determine a new time for RTC 124. Hardware of user interface 122 may then set RTC 124 with the new time.

RTC 124 is a clock that keeps track of the time even when computer 120 is turned off and, thus, maintains a persistent time. RTC 124 runs on a special battery or other power storage device that is not connected to the normal power supply. In contrast, clocks, such as protected RTC 130, do not function when the computer is off. In other embodiments, RTC 124 may be backed by the battery and run off of normal power while normal power is available.

Embedded manageability device 126 may be an embedded device with firmware to enable encrypted and persistent asset management as well as remote diagnostics/recovery capabilities via a management console such as IT management console 170. In the present embodiment, embedded manageability device 126 may couple with RTC 124 to determine a trusted time differential between a system time from RTC 124 and a trusted time from protected RTC 130. Embedded manageability device 126 may then set the trusted time based upon the system time and the trusted time differential in the event of a loss of power to protected RTC 130.

Embedded manageability device 126 may store the time differential in a non-volatile memory such as flash memory 128 and set the trusted time of protected RTC 130. In several embodiments, flash memory 128 and protected RTC 130 are dedicated hardware managed by embedded manageability device 126. In further embodiments, flash memory 128 and/or protected RTC 130 are part of embedded manageability device 126.

In other embodiments, a portion of flash memory 128 may be allocated to embedded manageability device 126 and protected from corruption via a secure environment of computer 120. For example, a memory controller hub of computer 120 may facilitate access to the portion of flash memory allocated to embedded manageability device 126 via trusted or authenticated code and/or via a trusted component such as embedded manageability device 126.

Protected RTC 130 may maintain a trusted time and embedded manageability device 126 may manage communications with protected RTC 130 to prevent modification of the trusted time by a non-trusted time source, such as user 110 and remote computers such as computer 140. In many embodiments, protected RTC 130 does not have a battery backup, advantageously saving the space and costs associated with providing and maintaining a dedicated battery separate from the special battery dedicated for RTC 124. For example, when computer 120 is booted for the first time, embedded manageability device 126 may communicate with trusted time source 160 to obtain a trusted time. Embedded manageability device 126 may then set protected RTC 130 with the trusted time and maintain the trusted time via the persistent time of RTC 124.

Network 150 is a network connection such as a local area network or wide area network to couple computers 120 and 140, trusted time source 160, and IT management console 170 to facilitate communications. In some embodiments, network 150 may include a network in an office coupled via Ethernet, optical media like OptiConnect, a wireless network, or the like. In several embodiments, network 150 also couples with the Internet via a cable modem, a digital subscriber line (DSL), a T1 line, a T3 line, or the like. In further embodiments, network 150 may include a network of temporary connections such as connections via a telephone system.

Trusted time source 160 may be a secure source, which is successfully authenticated with embedded manageability device 126 based on authentication information configured for the device. The authentication information may be, e.g., a username/password pair used as part of a hypertext transfer protocol (HTTP) authentication or a transport layer security (TLS) client/server certificate signed by a root certificate authority (CA) trusted by embedded manageability device 126. TLS is a system to secure Internet communication protocols that utilize a public/private key pair and a cryptographic certificate, which binds the trusted time source's identity to the public key. In some embodiments, trusted time source 160 may be part of IT management console 170.

Information technology (IT) console 170 may maintain inventory and locations of assets such as computers 120 and 140 as well as perform remote diagnostics and recovery operations for assets such as computers 120 and 140. For instance, embedded manageability device 126 may couple with persistent memory of computer 120 such as flash memory 128 to access event logs and error logs even when computer 120 is powered down. In several embodiments, IT management console 170 may power up and boot computer 120 via embedded manageability device 126 to, e.g., install software updates, catalog software installed on computer 120, and inventory assets within computer 120 such as memory cards, hard disk drives, compact disk drives, and the like.

Figure 2:
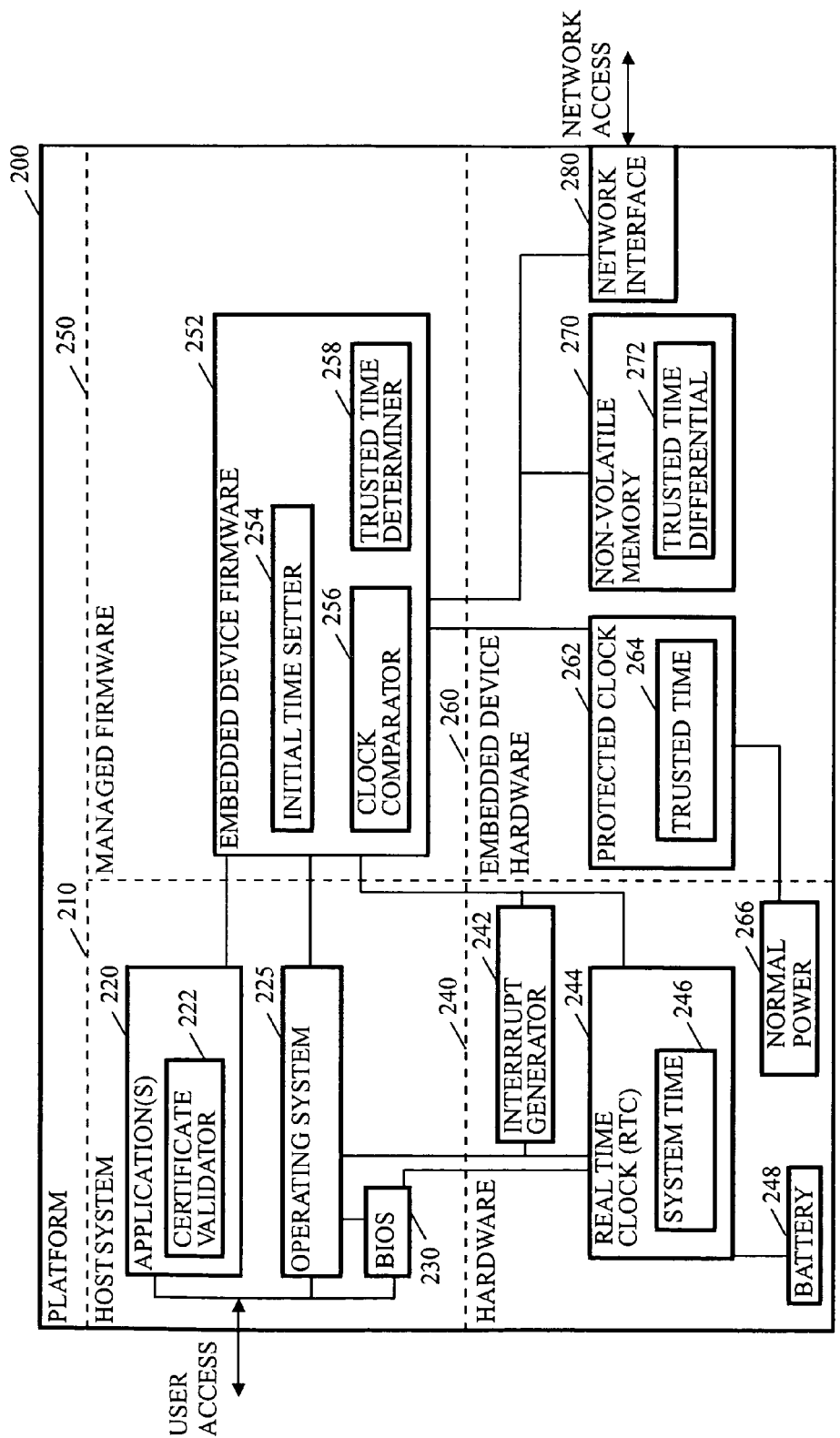
FIG. 2 depicts an embodiment of a computational platform with managed firmware and dedicated hardware.

FIG. 2 illustrates an embodiment of a computational platform 200 with managed firmware 250 and embedded device hardware 260 to persist a trusted time 264 for a protected clock 262 based upon a non-trusted but persistent time source, RTC 244. For example, platform 200 may be one of many computers tasked for a new company project. Platform 200, upon connection to an intranet or local area network (LAN) at the project site may communicate with a central server to report a physical location for platform 200 via an intranet address, receive software updates for standard project software, and download special software allocated for this project site. Platform 200 may also communicate with a trusted time source via the LAN. In other embodiments, platform 200 may simply update the trusted time 264 of protected clock 262 upon boot based upon a trusted time differential 272 because the system time 246 of RTC 244 has been maintained by battery 248 while moving platform 200 to this new project site.

Computational platform 200 may be a personal computer such as a workstation or a server and may comprise a host system 210, hardware 240, managed firmware 250, and embedded device hardware 260. Host system 210 may comprise software operating as a host for one or more applications for a user. In particular, basic input-output system (BIOS 230) may perform basic functionality such as integrity verification for the system memory and initial program loads (IPLs) before transferring control over to an operating system 225. In many embodiments, a user may access RTC 246 via an interface of BIOS 230 to set the system time 244 prior to or during IPLs.

RTC 244 may reside in, e.g., an input-output (I/O) control hub of hardware 240 and the I/O control hub may comprise an interrupt generator 242 to generate an interrupt request (IRQ) in response to a request to change the system time 246. For example, interrupt generator 242 may produce an IRQ and transmit the IRQ to embedded device firmware 252 via an interrupt controller such as an INTEL 8259 interrupt controller or similar logic integrated with the chipset. In other embodiments, interrupt generator 242 may generate a message-signal interrupt (MSI), which is communicated to embedded device firmware 252 in a manner similar to that of a write transaction. In further embodiments, interrupt generator 242 may reside in other hardware and/or software.

Operating system 225 may be a large, relatively complex, low-level software that serves as an interface of hardware 240 for application(s) 220. For example, operating system 225 may be a version of Windows (95, 98, NT, ME, 2000, XP), Macintosh OS X, Linux, Unix (Solaris, AIX, HP-UX, etc.), or the like. Similar to BIOS 230, operating system 225 may provide a user interface to facilitate modification of the system time 246 by a user. Operating system 225 may provide an interface for system time 246 through preference panels of built into operating system 255 or application(s) 220.

In some embodiments, operating system 225 may advantageously utilize the trusted time 264 in lieu of the system time 246 when, for example, battery 248 is depleted or has insufficient power to maintain RTC 244. In such embodiments, embedded device firmware 252 or operating system 225 may also generate an alert indicative of the failure of battery 248. Embedded device firmware 252 and/or operating system 225 may log the alert in an error log, transmit the alert to a remote management system via a network interface 280, and/or notify the user of the failure via, e.g., an alert message on a display coupled with platform 200.

Application(s) 220 are higher-level software that perform more complex functions for a user such as word processing, graphical illustration, video editing, and other high level functions. Application(s) 220 may comprise a certificate validator 222 to communicate with protected clock 262. In particular, certificate validator 222 may validate security certificates based upon the trusted time 264 to provide access to, e.g., hard disk drives or other data storage on platform 200 by a remote user. For example, platform 200 may maintain project data related to budgetary estimates for various stages of the project and a remote user may gain access to the budgetary data by providing a trusted, authenticated security certificate that has not yet expired. In response to such a request, certificate validator 222 may communicate with embedded device firmware 252 to read the trusted time 264 for validating security certificates.

Managed firmware 250 may be a secure environment that restricts communication with non-trusted software or other code as well as communications with trusted and authenticated code, albeit to a lesser extent. In the present embodiment, managed firmware 250 comprises embedded device firmware 252 to manage communications with embedded device hardware 260. In some embodiments, embedded device firmware 252 may be built into an embedded manageability device that may also include some elements of embedded device hardware 260. For instance, non-trusted code such as operating system 225 and certificate validator 222 may be allowed to read the trusted time 264 of protected clock 262 but may have no rights to change the trusted time 264. On the other hand, embedded device firmware 252 is trusted and authenticated code that may modify the trusted time 264 under specified conditions.

Embedded device firmware 252 may comprise an initial time setter 254, a clock comparator 256, and a trusted time determiner 258. Initial time setter 254 may couple with a network interface 280 to communicate with a trusted time source to set the protected clock 262 with the trusted time at least once. Initial time setter 254 communicates with a trusted time source via network interface 280 to obtain a trusted time 264 to set protected clock 262 the first time platform 200 is booted. Initial time setter 254 then communicates with protected clock 262 to set the trusted time 264. In some embodiments, managed firmware 250 may not allow initial time setter 254 to modify the trusted time 264 with a new setting unless platform 200 was recently booted.

Clock comparator 256 is responsive to an interrupt from interrupt generator 242 that indicates a user set RTC 244 with a new system time 246. Upon receipt of the interrupt, clock comparator 256 may update the trusted time differential 272 of a non-volatile memory 270 based upon the trusted time 264 and the new system time 246. For example, a user at the new project site may login and modify the system time 246 by two hours, which is the difference in time zones between the original location of platform 200 and the new project site. Interrupt generator 242 transmits an interrupt request to embedded device firmware 252 while updating the system time 246. In response to the interrupt request, clock comparator 256 may subtract the trusted time 264 from the new system time 244 to determine a new, trusted time differential 272 of two hours. Clock comparator 256 may then store an indication of two hours in trusted time differential 272 of non-volatile memory 270.

Trusted time determiner 258 may be trusted and authenticated code that is allowed to update the trusted time 264 of protected clock 262 in the event of a power loss to protected clock 262. In particular, when the normal power source 266, which is the primary power source of platform 200, is restored after a power loss and platform 200 boots, trusted time determiner 258 determines the trusted time 272. To determine the trusted time 272, trusted time determiner 258 may read the system time 246 before a non-trusted source can establish access to modify the system time 246 via BIOS 230. The non-trusted source may be, e.g., code or a user. Trusted time determiner 258 may read the system time 246 to determine the trusted time 272 because the system time 246 is advantageously maintained through the power loss by battery 248. Trusted time determiner 258 may then add the trusted time differential 272 of non-volatile memory 270 to the system time 246 to calculate the trusted time 264. Thereafter, trusted time determiner 258 will set the protected clock 262 with the trusted time 264.

Embedded device hardware 260 may be hardware of platform 200 managed by managed firmware 250 for use by embedded device firmware 252. In some embodiments, a part or all of embedded device hardware 260 may be built into an embedded manageability device.

Embedded device hardware 260 may comprise protected clock 262, non-volatile memory 270, and network interface 280. Protected clock 262 may be circuitry that maintains the trusted time 264 while powered via normal power source 266. Non-volatile memory 270 may be any form of writeable memory that can maintain data without being powered. For instance, non-volatile memory 270 may include flash memory, electrically-erasable read only memory, and/or the like.

Network interface 280 may comprise a port to provide access to a network. For instance, network interface 280 may comprise a hardware connection or device to physically connect platform 200 with an Ethernet cable, optical media, a wireless network, or the like.

Figure 3:
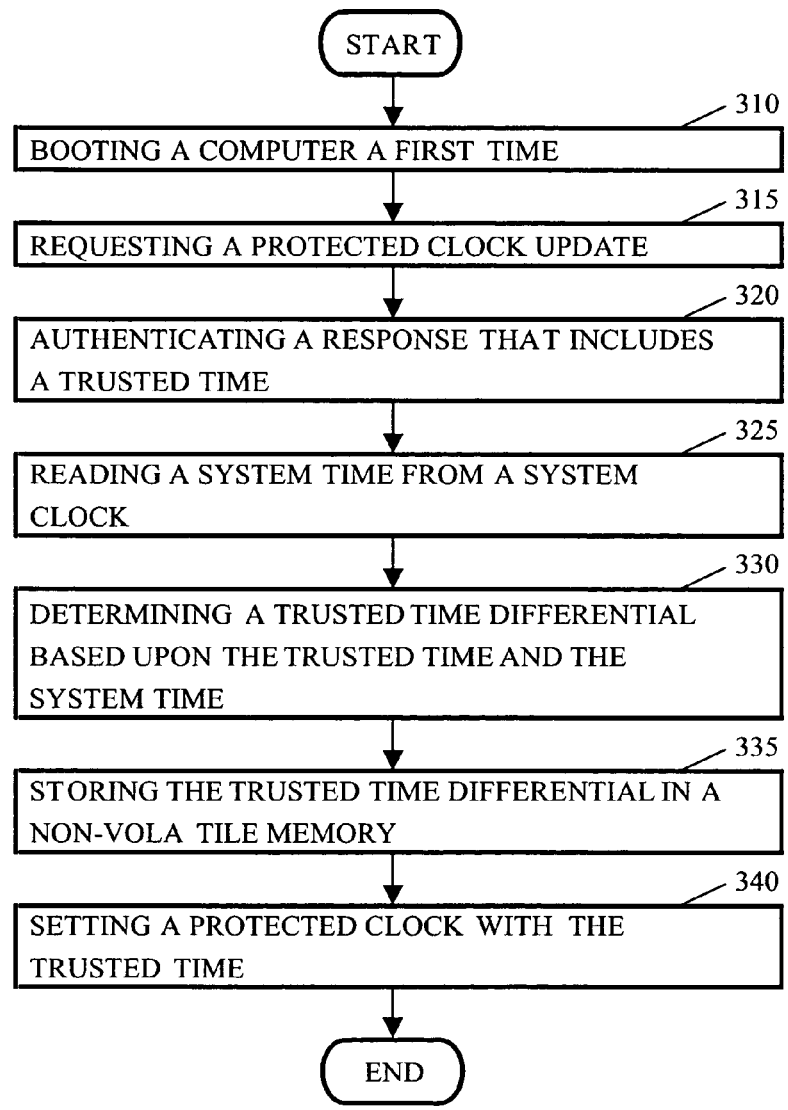
FIG. 3 depicts a flowchart of an embodiment to initialize a protected clock with a trusted time.

FIG. 3 depicts a flowchart 300 of an embodiment to initialize a protected clock with a trusted time. In particular, flowchart 300 describes functionality of a computer such as platform 200 in FIG. 2. Flowchart 300 begins with booting a computer a first time (element 310). For instance, the computer may have just arrived so a user plugs the computer into a power outlet and presses the power switch.

Once the computer is powered, an embedded manageability device may transmit a request for a protected clock update to a trusted time source (element 315). The trusted time source may respond with a message encrypted with a private key, which includes the trusted time, and a security certificate. The security certificate comprises the identity of the trusted time source, and is signed by a trusted certificate authority.

Upon receipt of the encrypted message, the embedded manageability device authenticates the message by decrypting the message with a public key for the trusted time source (element 320). Decrypting the message provides access to the trusted time.

The embedded manageability device may then read a system time from a system clock (element 325) and determine a trusted time differential based upon the trusted time and the system time (element 330). In many embodiments, the embedded manageability device subtracts the trusted time from the system time to determine the trusted time differential. The embedded manageability device then stores the trusted time differential in a non-volatile memory (element 335).

The embedded manageability device may also set a protected clock with the trusted time (element 340) substantially simultaneously with the determination of the trusted time differential. In other embodiments, the embedded manageability device sets the protected clock before or after determining and/or storing the trusted time differential.

Figure 4:
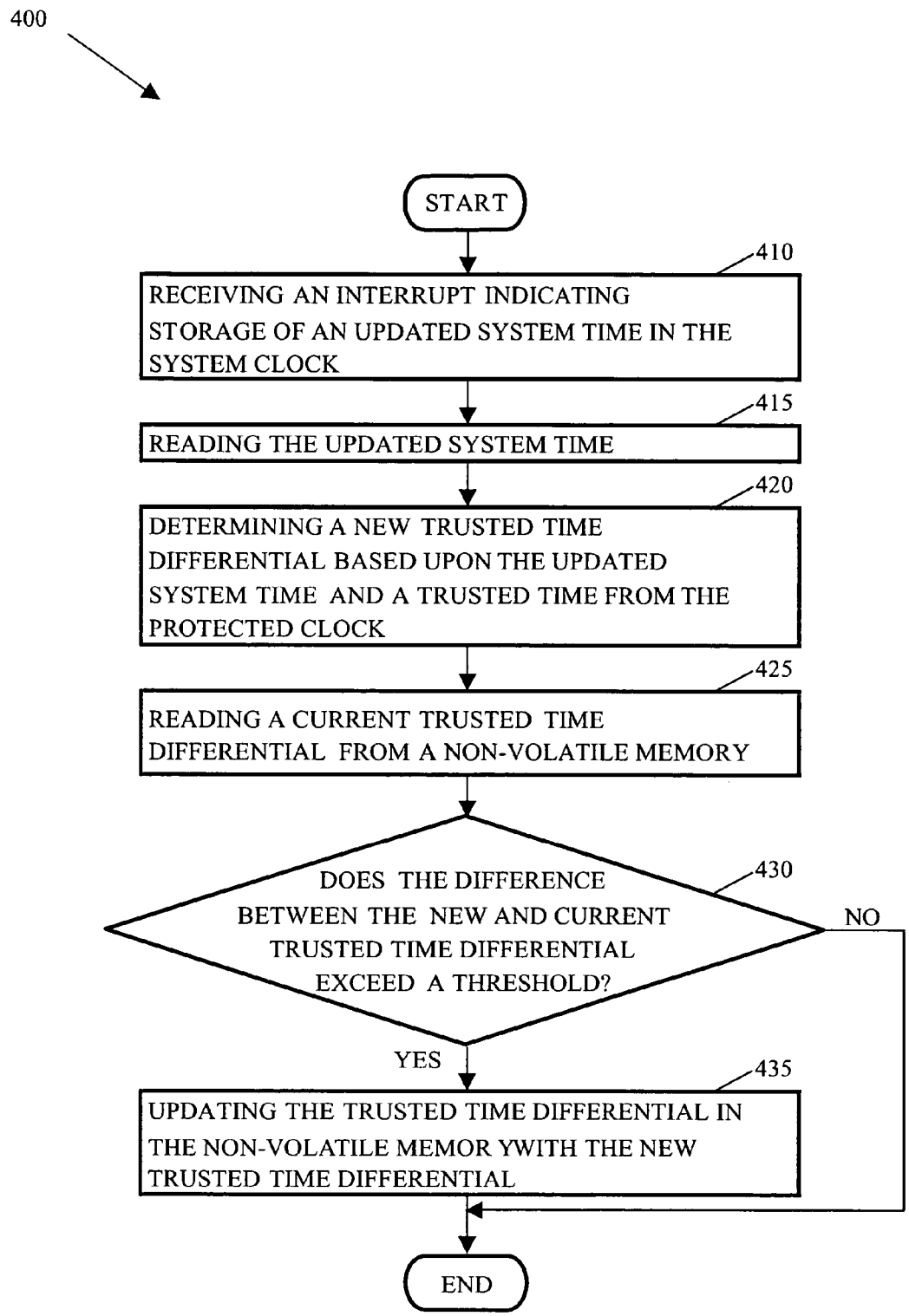
FIG. 4 depicts a flowchart of an embodiment to update a protected clock in response to a modification of a time setting for a non-trusted clock.

FIG. 4 depicts a flowchart 400 of an embodiment to update a protected clock in response to a modification of a time setting for a non-trusted, system clock. In particular, flowchart 400 describes functionality of an embedded manageability device such as the embedded device firmware 252 in FIG. 2. Flowchart 400 begins with receiving an interrupt indicating storage of an updated system time in the system clock (element 410). In other embodiments, the embedded manageability device receives a communication other than an interrupt request that indicates the system time is being modified.

In response to receipt of the interrupt, the embedded manageability device reads the updated system time (element 415). In some embodiments, the embedded manageability device may generate a read request to determine the updated system time for the system clock. In other embodiments, the embedded memory device may have a more direct method of determining the updated system time.

With the updated system time, the embedded manageability device determines a new trusted time differential based upon a trusted time from the protected clock (element 420). In particular, the embedded manageability device may subtract the updated system time from the trusted time or vice versa to determine the trusted time differential.

After determining the new time differential, the embedded device may read a current trusted time differential from a non-volatile memory (element 425). If the new time differential is significantly different than the current time differential, the embedded manageability device may write the new time differential into the non-volatile memory. The significance of the difference may be based upon the granularity of the time maintained for, e.g., determining whether a security certificate has expired, maintaining an error log, and/or the like. For example, in some embodiments, if the difference between the new and current trusted time differentials does not exceed a threshold value such as an hour (element 430), the embedded manageability device may ignore the change to advantageously extend the life of the non-volatile memory.

On the other hand, if the difference between the new and current trusted time differentials does exceed the threshold value (element 430), the embedded manageability device may update the time differential in the non-volatile memory with the new trusted time differential (element 435).

Figure 5:
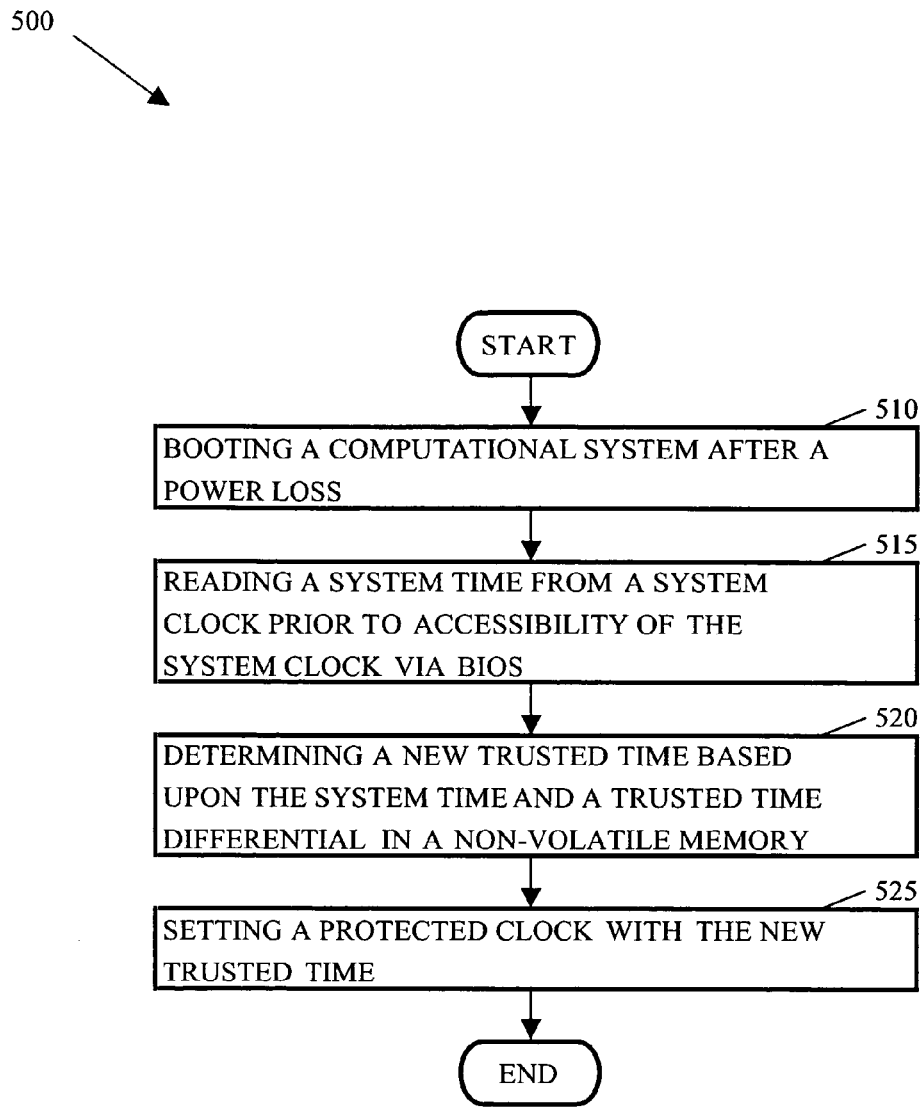
FIG. 5 depicts a flowchart of an embodiment to reset a protected clock with a trusted time after a loss of power to the protected clock while a computational system is powered down.

Referring now to FIG. 5, there is shown a flowchart 500 of an embodiment to reset a protected clock with a trusted time after a loss of power to the protected clock while a computational system is powered down. Flowchart 500 may describe functionality of a computational system such as computer 120 of FIG. 1. Flowchart 500 begins with booting the computational system after a power loss (element 510). For example, a user may turn off the system via a power strip, cutting off power to the protected clock. For embodiments in which a battery or other power storage device does not back the protected clock, the trusted time maintained by the protected clock is lost. The user may then reboot the system when the user is ready to work with the system again.

As the BIOS loads but prior to a user's ability to access the BIOS to change the system time, the embedded manageability system may read the system time from the system clock (element 515). For example, the embedded manageability device may wait for the BIOS to establish functionality to read the system clock and then read the system clock before a non-trusted user has time to write a new time to the system clock. In other embodiments, the embedded manageability device may be capable of reading the system clock before the BIOS loads.

After reading the system time, the embedded manageability device may determine a new trusted time based upon the system time and a trusted time differential, which is stored in a non-volatile memory (element 520). In other words, the embedded manageability system reads the trusted time differential established prior to the power loss and calculates a new system time based upon the system time shortly after power is restored to assure that the time that elapsed during the loss of power is accurately reflected by the system time. Thus, the embedded manageability device advantageously leverages the ability of the system clock to keep time while the system is powered down.

Upon determining the new trusted time via the system time and the trusted time differential, the embedded manageability device sets the protected clock with the new trusted time (element 525). For instance, the embedded manageability device may add the trusted time differential to the system time to determine a new trusted time.

One embodiment of the invention is implemented as a program product for use with a computer system such as, for example, the system 100 shown in FIG. 1. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., hard-disk drive or floppy disks within a diskette drive); and (iii) information conveyed to a computer by a communications medium, such as through a computer or telephone network, including wireless communications. The latter embodiment specifically includes information downloaded from the Internet and other networks. Such signal-bearing media, when carrying machine-accessible instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-accessible format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates systems and arrangements to persist a trusted time for a protected clock based upon a non-trusted but persistent time source. It is understood that the form of the invention shown and described in the detailed description and the drawings are to be taken merely as examples. It is intended that the following claims be interpreted broadly to embrace all the variations of the embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for maintaining a trusted time with a protected clock in an embedded device of local computational platform, the method comprising:

receiving, by an embedded device of the local computational platform, from a trusted time source, the trusted time the protected clock, the protected clock being protected from modification by a non-trusted time source, after receiving the trusted time;

comparing, by the embedded device, the trusted time from a trusted time source against a persistent time from a system clock in the local computational platform to determine a trusted time differential, the persistent time of the system clock being accessible by a non-trusted time source;

storing, by the embedded device, the time differential in a non-volatile memory of the embedded device, the non-volatile memory being protected from modification by the non-trusted time source;

setting, by the embedded device, a protected clock within the embedded device with the trusted time based upon the persistent time and the trusted time differential in response to losing the trusted time due to a loss of power to the protected clock;

updating the trusted time differential in response to a modification of the persistent time, by the embedded device, by determining a new time differential based upon a modified persistent time from the system clock and a current trusted time from the protected clock and storing the new time differential in the non-volatile memory;
generating an alert message in response to determining that a power storage device, which is used to persist the persistent time, is substantially depleted; and
validating a security certificate by reading the protected clock.

2. The method of claim 1, wherein storing the new time differential in the non-volatile memory comprises storing the new time differential if the new time differential exceeds a threshold time differential.

3. The method of claim 1, further comprising determining the trusted time differential upon boot of the local computational platform that utilizes the system clock prior to availability of access to the system clock by the non-trusted source via the local computational platform.

4. The method of claim 1, further comprising communicating with a trusted time source to determine the trusted time to initially set the protected clock.

5. The method of claim 1, further comprising reading the protected clock to validate a security certificate.

6. The method of claim 1, further comprising reading the trusted time to generate an entry for an event log.

7. An apparatus for a local computational platform for maintaining a trusted time with a protected clock for the local computational platform, comprising:
the protected clock to maintain the trusted time, the protected clock being protected from modification by a non-trusted time source;
an initial time setter to couple with a network interface to receive the trusted time from a trusted time source and to set the protected clock with the trusted time at least once;
a clock comparator to couple with a system clock to determine a trusted time differential based upon a system time from the system clock and the trusted time and to update the trusted time differential in response to a modification of the system time of the system clock, by determining a new time differential based upon a modified system time from the system clock and a current trusted time from the protected clock and storing the new time differential in a non-volatile memory;
the non-volatile memory to couple with the clock comparator to store the trusted time differential;
a trusted time determiner to set the trusted time of the protected clock based upon the system time and the trusted time differential in response to a loss of power to the protected clock;
the apparatus to generate an alert message in response to determining that a power storage device, which is used to persist the persistent time, is substantially depleted; and
a certificate validator to couple with the protected clock, wherein the certificate validator is to validate a security certificate based upon the trusted time.

8. The apparatus of claim 7, further comprising an initial time setter to couple with a network interface to communicate with a trusted time source to set the protected clock with the trusted time at least once.

9. The apparatus of claim 7, wherein the protected clock is to coupled with a normal power source of the local computational platform to maintain the trusted time.

10. The apparatus of claim 7, wherein the clock comparator comprises logic responsive to an interrupt indicative of setting the system clock with the modified system time, to update the trusted time differential based upon the current trusted time and the modified system time.

11. The apparatus of claim 7, wherein the clock comparator comprises logic responsive to the interrupt to update the trusted time differential when a difference between the modified system time and the system time exceeds a threshold time differential.

12. The apparatus of claim 7, wherein the trusted time determiner comprises logic to determine the trusted time differential upon booting a computational system in which the system clock resides prior to availability of access to the system clock by the non-trusted time source via the computational system.

13. A system, comprising:
a system clock to maintain a persistent time;
an interface coupled with the system clock to facilitate a modification of the persistent time by a non-trusted time source;
a dynamic random access memory coupled with the interface, the dynamic random access memory to store code, wherein the code is to interact with the non-trusted time source to determine the modification;
an interrupt generator to generate an interrupt in response to the modification;
an embedded device to maintain a trusted time and protect the trusted time from modification by a non-trusted time source; to respond to the interrupt to update a trusted time differential based upon the persistent time and the trusted time by determining a new time differential based upon a modified persistent time from the system clock and a current trusted time from a protected clock of the embedded device; to store the trusted time differential, wherein storage of the trusted time differential is persistent with respect to a loss of power to the embedded device; and to set the trusted time in the protected clock based upon the persistent time and the trusted time differential in response to the loss of power, wherein the embedded device comprises an initial time setter to receive the trusted time from a trusted time source and to set the trusted time in the protected clock when the system is initially booted;
the system to generate an alert message in response to determining that a power storage device, which is used to persist the persistent time, is substantially depleted; and
a certificate validator to couple with the protected clock, wherein the certificate validator is to validate a security certificate based upon the trusted time.

14. The system of claim 13, wherein the embedded device comprises an initial time setter to communicate with a trusted time source to set the trusted time when the system is initially booted.

15. The system of claim 14, wherein the embedded device comprises a network interface coupled with the initial time setter to communicate with the trusted time source.

16. The system of claim 13, wherein the embedded device comprises logic to determine the trusted time differential upon boot of the system and prior to availability of access to the system clock by the non-trusted source.

17. A tangible, machine-accessible, storage medium containing instructions for maintaining a trusted time with a protected clock in an embedded device of the local computational platform, wherein the tangible, machine-accessible, storage medium does not comprise transitory signals, wherein the instructions, when executed by a machine, cause said machine to perform operations, comprising:

receiving from a trusted time source, the trusted time;
initially setting the protected clock, the protected clock being protected from modification by a non-trusted time source based upon receiving the trusted time;
comparing, by the embedded device, the trusted time from a trusted time source against a system time from a system clock in the local computational platform to determine a trusted time differential, the system time of the system clock being accessible by a non-trusted time source; and
storing, by the embedded device, the time differential in a non-volatile memory of the embedded device, the non-volatile memory being protected from modification by the non-trusted time source;
setting, by the embedded device, a protected clock within the embedded device with the trusted time based upon the system time and the trusted time differential in response to losing the trusted time due to a loss of power to the protected clock;
updating the trusted time differential in response to a modification of the system time, by the embedded device, by determining a new time differential based upon a modified system time from the system clock and a current trusted time from the protected clock and storing the new time differential in the non-volatile memory;
generating an alert message in response to determining that a power storage device, which is used to persist the persistent time, is substantially depleted; and
validating a security certificate by reading the protected clock.

18. The tangible, machine-accessible, storage medium of claim 17, wherein the operations further comprise determining the trusted time differential upon boot of a computational system that utilizes the system clock and prior to availability of access to the system clock by the non-trusted source via the computational system.

19. The tangible, machine-accessible, storage medium of claim 17, wherein storing the new time differential in the non-volatile memory comprises storing the new time differential if the new time differential exceeds a threshold time differential.

20. A method for maintaining a trusted time with a protected clock in an embedded device of local computational platform, the method comprising:
receiving, by an embedded device of the local computational platform, from a trusted time source, the trusted time to initially set the protected clock, the protected clock being protected from modification by a non-trusted time source;
comparing, by the embedded device, the trusted time from a trusted time source against a persistent time from a system clock in the local computational platform to determine a trusted time differential, the persistent time of the system clock being accessible by a non-trusted time source;
storing, by the embedded device, the time differential in a non-volatile memory of the embedded device, the non-volatile memory being protected from modification by the non-trusted time source;
setting, by the embedded device, a protected clock within the embedded device with the trusted time based upon the persistent time and the trusted time differential in response to losing the trusted time due to a loss of power to the protected clock;
updating the trusted time differential in response to a modification of the persistent time, by the embedded device, by determining a new time differential based upon a modified persistent time from the system clock and a current trusted time from the protected clock and storing the new time differential in the non-volatile memory; and
validating a security certificate by reading the protected clock.

21. The method of claim 20, wherein storing the new time differential in the non-volatile memory comprises storing the new time differential if the new time differential exceeds a threshold time differential.

22. The method of claim 20, further comprising determining the trusted time differential upon boot of the local computational platform that utilizes the system clock prior to availability of access to the system clock by the non-trusted source via the local computational platform.

23. The method of claim 20, further comprising generating an alert message in response to determining that a power storage device, which is used to persist the persistent time, is substantially depleted.

24. The method of claim 20, further comprising communicating with a trusted time source to determine the trusted time to initially set the protected clock.

25. The method of claim 20, further comprising reading the trusted time to generate an entry for an event log.

26. An apparatus for a local computational platform for maintaining a trusted time with a protected clock for the local computational platform, comprising:
the protected clock to maintain the trusted time, the protected clock being protected from modification by a non-trusted time source;
an initial time setter to couple with a network interface to receive the trusted time from a trusted time source to set the protected clock with the trusted time at least once;
a clock comparator to couple with a system clock to determine a trusted time differential based upon a system time from the system clock and the trusted time and to update the trusted time differential in response to a modification of the system time of the system clock, by determining a new time differential based upon a modified system time from the system clock and a current trusted time from the protected clock and storing the new time differential in a non-volatile memory;
the non-volatile memory to couple with the clock comparator to store the trusted time differential;
a trusted time determiner to set the trusted time of the protected clock based upon the system time and the trusted time differential in response to a loss of power to the protected clock; and
a certificate validator to couple with the protected clock to read the trusted time, wherein the certificate validator is to validate a security certificate based upon the trusted time.

27. The apparatus of claim 26, further comprising an initial time setter to couple with a network interface to communicate with a trusted time source to set the protected clock with the trusted time at least once.

28. The apparatus of claim 26, wherein the protected clock is to coupled with a normal power source of the local computational platform to maintain the trusted time.

29. The apparatus of claim 26, wherein the clock comparator comprises logic responsive to an interrupt indicative of setting the system clock with the modified system time, to update the trusted time differential based upon the current trusted time and the modified system time.

30. The apparatus of claim 26, wherein the clock comparator comprises logic responsive to the interrupt to update the trusted time differential when a difference between the modified system time and the system time exceeds a threshold time differential.

31. The apparatus of claim 26, wherein the trusted time determiner comprises logic to determine the trusted time differential upon booting a computational system in which the system clock resides prior to availability of access to the system clock by the non-trusted time source via the computational system.

32. A system, comprising:
a system clock to maintain a persistent time;
an interface coupled with the system clock to facilitate a modification of the persistent time by a non-trusted time source;
a dynamic random access memory coupled with the interface, the dynamic random access memory to store code, wherein the code is to interact with the non-trusted time source to determine the modification;
an interrupt generator to generate an interrupt in response to the modification;
an embedded device to maintain a trusted time and protect the trusted time from modification by a non-trusted time source; to respond to the interrupt to update a trusted time differential based upon the persistent time and the trusted time by determining a new time differential based upon a modified persistent time from the system clock and a current trusted time from a protected clock of the embedded device; to store the trusted time differential, wherein storage of the trusted time differential is persistent with respect to a loss of power to the embedded device; and to set the trusted time in the protected clock based upon the persistent time and the trusted time differential in response to the loss of power, wherein the embedded device comprises an initial time setter to receive the trusted time from a trusted time source to set the trusted time in the protected clock when the system is initially booted; and
a certificate validator to couple with the protected clock to read the trusted time, wherein the certificate validator is to validate a security certificate based upon the trusted time.

33. The system of claim 32, wherein the embedded device comprises an initial time setter to communicate with a trusted time source to set the trusted time when the system is initially booted.

34. The system of claim 33, wherein the embedded device comprises a network interface coupled with the initial time setter to communicate with the trusted time source.

35. The system of claim 32, wherein the embedded device comprises logic to determine the trusted time differential upon boot of the system and prior to availability of access to the system clock by the non-trusted source.

36. A tangible, machine-accessible, storage medium containing instructions for maintaining a trusted time with a protected clock in an embedded device of the local computational platform, wherein the tangible, machine-accessible, storage medium does not comprise transitory signals, wherein the instructions, when executed by a machine, cause said machine to perform operations, comprising:
receiving from a trusted time source, the trusted time to initially set the protected clock, the protected clock being protected from modification by a non-trusted time source;
comparing, by the embedded device, the trusted time from a trusted time source against a system time from a system clock in the local computational platform to determine a trusted time differential, the system time of the system clock being accessible by a non-trusted time source; and
storing, by the embedded device, the time differential in a non-volatile memory of the embedded device, the non-volatile memory being protected from modification by the non-trusted time source;
setting, by the embedded device, a protected clock within the embedded device with the trusted time based upon the system time and the trusted time differential in response to losing the trusted time due to a loss of power to the protected clock;
updating the trusted time differential in response to a modification of the system time, by the embedded device, by determining a new time differential based upon a modified system time from the system clock and a current trusted time from the protected clock and storing the new time differential in the non-volatile memory; and
validating a security certificate by reading the protected clock.

37. The tangible, machine-accessible, storage medium of claim 36, wherein the operations further comprise determining the trusted time differential upon boot of a computational system that utilizes the system clock and prior to availability of access to the system clock by the non-trusted source via the computational system.

38. The tangible, machine-accessible, storage medium of claim 36, wherein storing the new time differential in the non-volatile memory comprises storing the new time differential if the new time differential exceeds a threshold time differential.

39. A method for maintaining a trusted time with a protected clock in an embedded device of local computational platform, the method comprising:
receiving, by an embedded device of the local computational platform, from a trusted time source, the trusted time to initially set the protected clock, the protected clock being protected from modification by a non-trusted time source;
comparing, by the embedded device, the trusted time from a trusted time source against a persistent time from a system clock in the local computational platform to determine a trusted time differential, the persistent time of the system clock being accessible by a non-trusted time source;
storing, by the embedded device, the time differential in a non-volatile memory of the embedded device, the non-volatile memory being protected from modification by the non-trusted time source;
setting, by the embedded device, a protected clock within the embedded device with the trusted time based upon the persistent time and the trusted time differential in response to losing the trusted time due to a loss of power to the protected clock;
updating the trusted time differential in response to a modification of the persistent time, by the embedded device, by determining a new time differential based upon a modified persistent time from the system clock and a current trusted time from the protected clock and storing the new time differential in the non-volatile memory;
generating an entry for an event log by reading the trusted time; and
validating a security certificate by reading the protected clock.

40. The method of claim 39, wherein storing the new time differential in the non-volatile memory comprises storing the new time differential if the new time differential exceeds a threshold time differential.

41. The method of claim 39, further comprising determining the trusted time differential upon boot of the local computational platform that utilizes the system clock prior to availability of access to the system clock by the non-trusted source via the local computational platform.

42. The method of claim 39, further comprising generating an alert message in response to determining that a power storage device, which is used to persist the persistent time, is substantially depleted.

43. The method of claim 39, further comprising communicating with a trusted time source to determine the trusted time to initially set the protected clock.

44. The method of claim 39, further comprising reading the protected clock to validate a security certificate.

45. An apparatus for a local computational platform for maintaining a trusted time with a protected clock for the local computational platform, comprising:
the protected clock to maintain the trusted time, the protected clock being protected from modification by a non-trusted time source;
an initial time setter to couple with a network interface to receive the trusted time from a trusted time source to set the protected clock with the trusted time at least once;
a clock comparator to couple with a system clock to determine a trusted time differential based upon a system time from the system clock and the trusted time and to update the trusted time differential in response to a modification of the system time of the system clock, by determining a new time differential based upon a modified system time from the system clock and a current trusted time from the protected clock and storing the new time differential in a non-volatile memory;
the non-volatile memory to couple with the clock comparator to store the trusted time differential;
a trusted time determiner to set the trusted time of the protected clock based upon the system time and the trusted time differential in response to a loss of power to the protected clock;
the apparatus to generate an entry for an event log by reading the trusted time; and
a certificate validator to couple with the protected clock, wherein the certificate validator is to validate a security certificate based upon the trusted time.

46. The apparatus of claim 45, further comprising an initial time setter to couple with a network interface to communicate with a trusted time source to set the protected clock with the trusted time at least once.

47. The apparatus of claim 45, wherein the protected clock is to coupled with a normal power source of the local computational platform to maintain the trusted time.

48. The apparatus of claim 45, wherein the clock comparator comprises logic responsive to an interrupt indicative of setting the system clock with the modified system time, to update the trusted time differential based upon the current trusted time and the modified system time.

49. The apparatus of claim 45, wherein the clock comparator comprises logic responsive to the interrupt to update the trusted time differential when a difference between the modified system time and the system time exceeds a threshold time differential.

50. The apparatus of claim 45, wherein the trusted time determiner comprises logic to determine the trusted time differential upon booting a computational system in which the system clock resides prior to availability of access to the system clock by the non-trusted time source via the computational system.

51. A system, comprising:
a system clock to maintain a persistent time;
an interface coupled with the system clock to facilitate a modification of the persistent time by a non-trusted time source;
a dynamic random access memory coupled with the interface, the dynamic random access memory to store code, wherein the code is to interact with the non-trusted time source to determine the modification;
an interrupt generator to generate an interrupt in response to the modification; and
an embedded device to maintain a trusted time and protect the trusted time from modification by a non-trusted time source; to respond to the interrupt to update a trusted time differential based upon the persistent time and the trusted time by determining a new time differential based upon a modified persistent time from the system clock and a current trusted time from a protected clock of the embedded device; to store the trusted time differential, wherein storage of the trusted time differential is persistent with respect to a loss of power to the embedded device; and to set the trusted time in the protected clock based upon the persistent time and the trusted time differential in response to the loss of power, wherein the embedded device comprises an initial time setter to receive the trusted time from a trusted time source to set the trusted time in the protected clock when the system is initially booted;
the system to generate an entry for an event log by reading the trusted time; and
a certificate validator to couple with the protected clock, wherein the certificate validator is to validate a security certificate based upon the trusted time.

52. The system of claim 51, wherein the embedded device comprises an initial time setter to communicate with a trusted time source to set the trusted time when the system is initially booted.

53. The system of claim 52, wherein the embedded device comprises a network interface coupled with the initial time setter to communicate with the trusted time source.

54. The system of claim 51, wherein the embedded device comprises logic to determine the trusted time differential upon boot of the system and prior to availability of access to the system clock by the non-trusted source.

55. A tangible, machine-accessible, storage medium containing instructions for maintaining a trusted time with a protected clock in an embedded device of the local computational platform, wherein the tangible, machine-accessible, storage medium does not comprise transitory signals, wherein the instructions, when executed by a machine, cause said machine to perform operations, comprising:
receiving from a trusted time source, the trusted time to initially set the protected clock, the protected clock being protected from modification by a non-trusted time source;

comparing, by the embedded device, the trusted time from a trusted time source against a system time from a system clock in the local computational platform to determine a trusted time differential, the system time of the system clock being accessible by a non-trusted time source; and storing, by the embedded device, the time differential in a non-volatile memory of the embedded device, the non-volatile memory being protected from modification by the non-trusted time source;

setting, by the embedded device, a protected clock within the embedded device with the trusted time based upon the system time and the trusted time differential in response to losing the trusted time due to a loss of power to the protected clock;

updating the trusted time differential in response to a modification of the system time, by the embedded device, by determining a new time differential based upon a modified system time from the system clock and a current trusted time from the protected clock and storing the new time differential in the non-volatile memory; and generating an entry for an event log by reading the trusted time; and validating a security certificate by reading the protected clock.

56. The tangible, machine-accessible, storage medium of claim 55, wherein the operations further comprise determining the trusted time differential upon boot of a computational system that utilizes the system clock and prior to availability of access to the system clock by the non-trusted source via the computational system.

57. The tangible, machine-accessible, storage medium of claim 55, wherein storing the new time differential in the non-volatile memory comprises storing the new time differential if the new time differential exceeds a threshold time differential.

* * * * *